United States Patent [19]

Martin

[11] 4,300,442
[45] Nov. 17, 1981

[54] COFFEE MAKER
[75] Inventor: Ernest N. Martin, Lynwood, Calif.
[73] Assignee: Societe d'Assistance Technique pour Produits Nestle SA, La Tour-de-Peilz, Switzerland
[21] Appl. No.: 144,695
[22] Filed: Apr. 28, 1980
[51] Int. Cl.³ .................. A47J 31/40; A47J 31/50
[52] U.S. Cl. ............................ 99/289 R; 222/228
[58] Field of Search .............. 99/289 R, 279, 280, 99/281, 282, 283, 288, 295, 305, 304, 307, 323.9; 222/228, 227, 242

[56] References Cited
U.S. PATENT DOCUMENTS

| 2,123,223 | 7/1938 | Ayars | 222/228 |
| 2,802,599 | 8/1957 | Callahan | 99/289 R |
| 3,425,338 | 2/1969 | Vittoe | 99/289 R |
| 3,446,137 | 5/1969 | Pryor | 99/289 R |
| 3,530,787 | 9/1970 | Litterio | 99/280 |

Primary Examiner—R. W. Jenkins
Attorney, Agent, or Firm—Georges A. Maxwell

[57] ABSTRACT

A coffee making machine comprising a thin-walled molded plastic shell-like housing with a two-piece molded core of heat insulating foam plastic slidably engaged in the housing; said machine includes a water supply unit including a tank with an electric heater means related to it, a hot water dispensing means communicating with the tank, a dehydrated granular coffee concentrate metering and dispensing unit and a coffee concentrate and hot water receiving and mixing unit with a coffee dispensing duct; said core has openings to cooperatively receive said water supply unit, water dispensing means and said concentrate metering and dispensing unit; said housing has openings to facilitate engagement of the core and means within the core therein and to provide access thereto; said housing has means to releasably receive and hold said mixing unit to receive water and concentrate from the water dispensing means and the dispensing unit and to deliver coffee into a drinking receptacle related to the machine.

18 Claims, 17 Drawing Figures

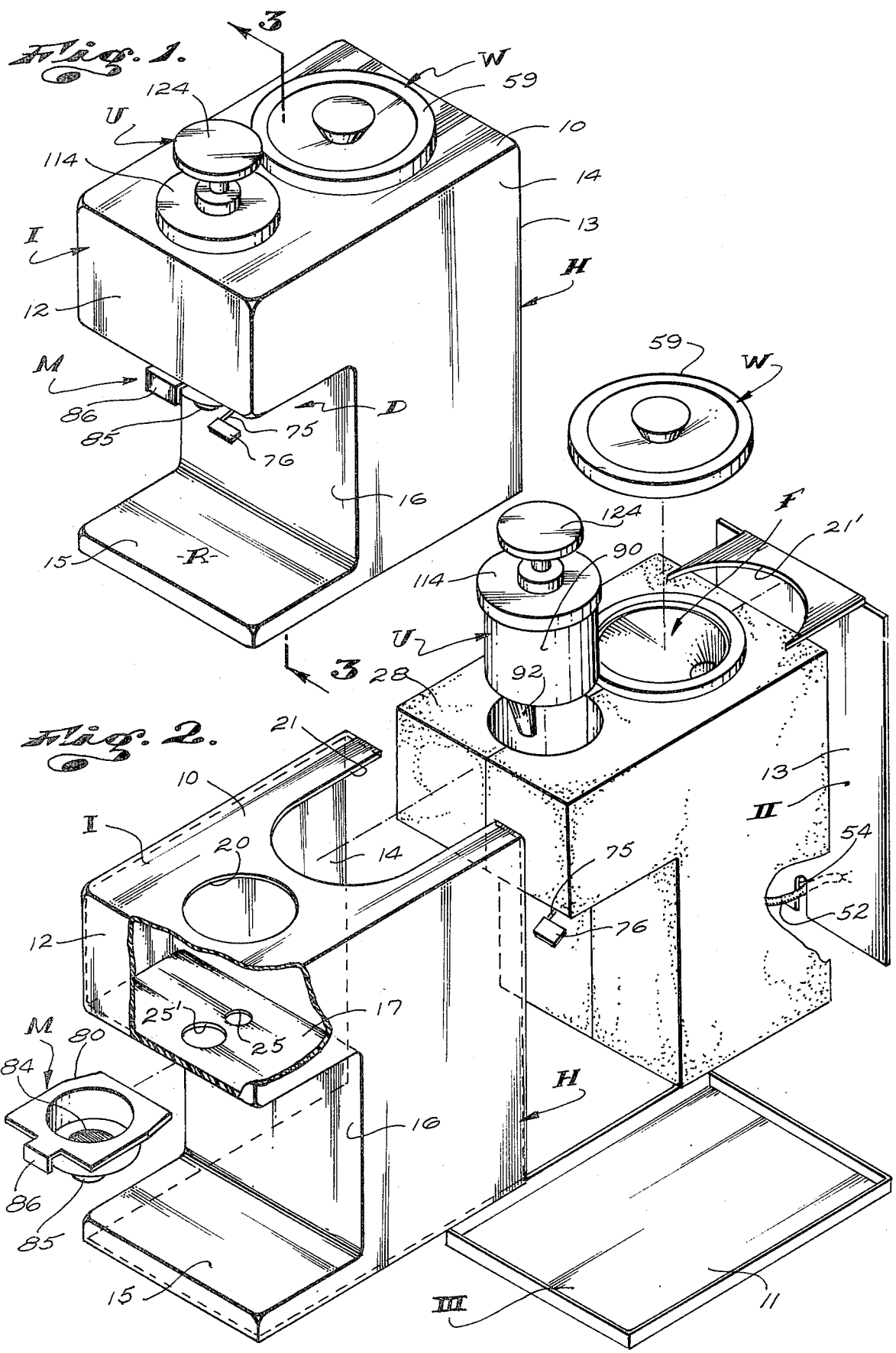

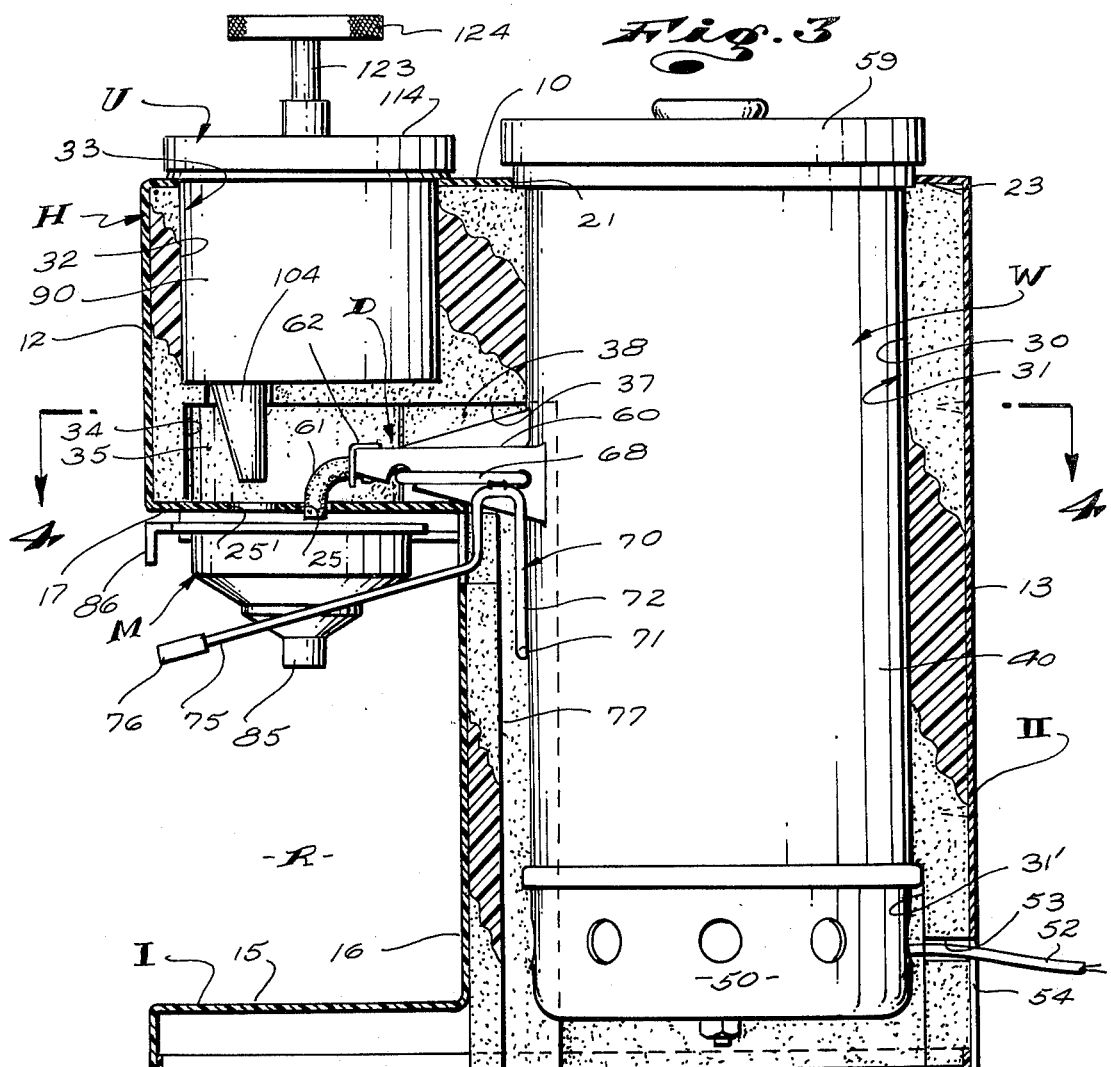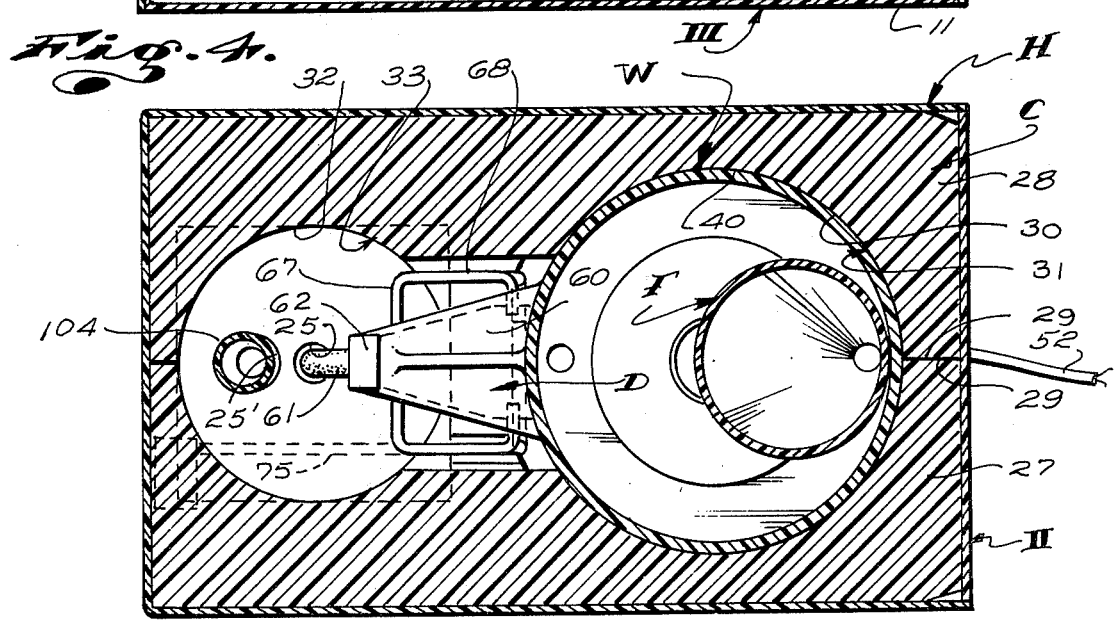

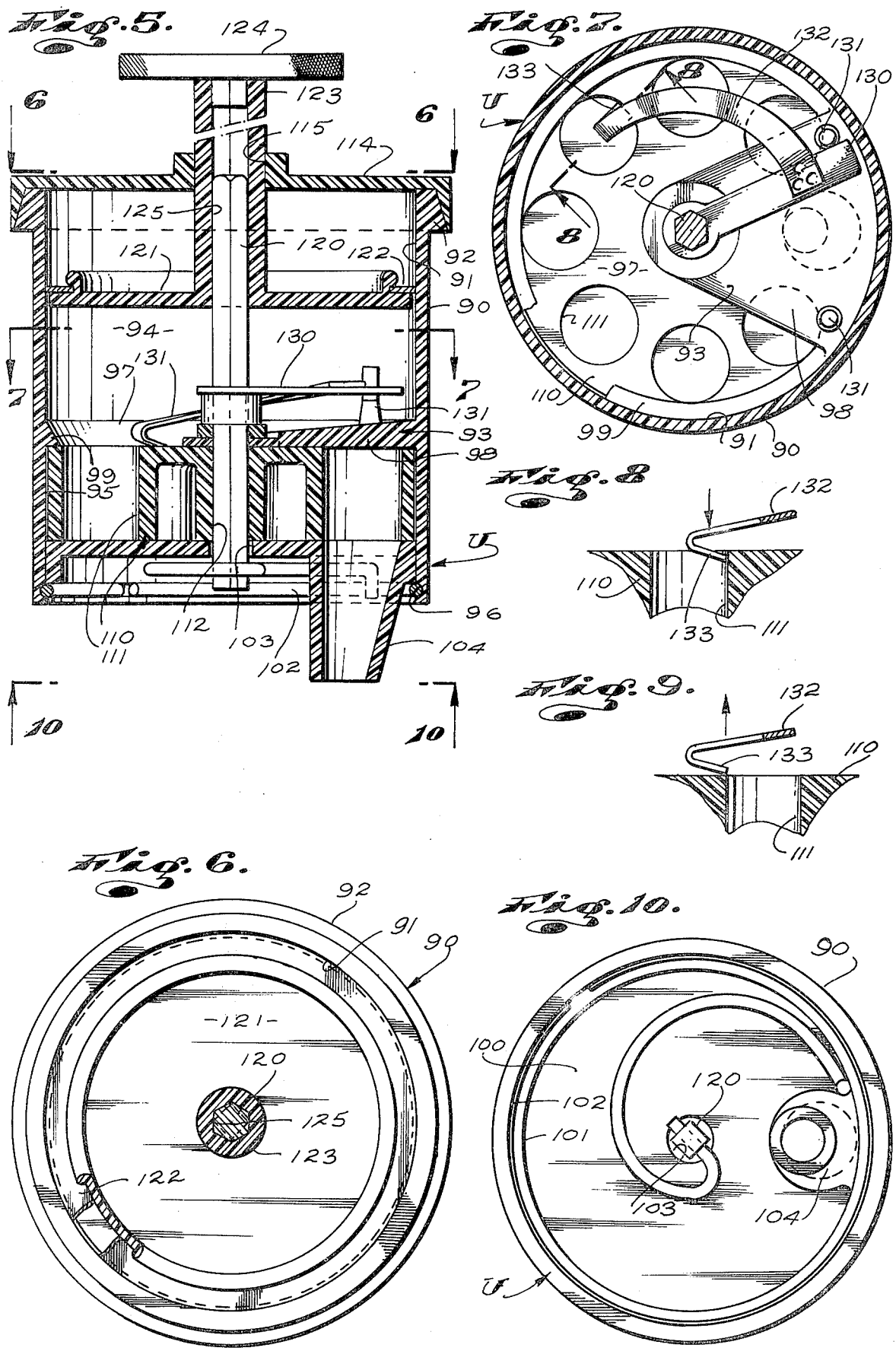

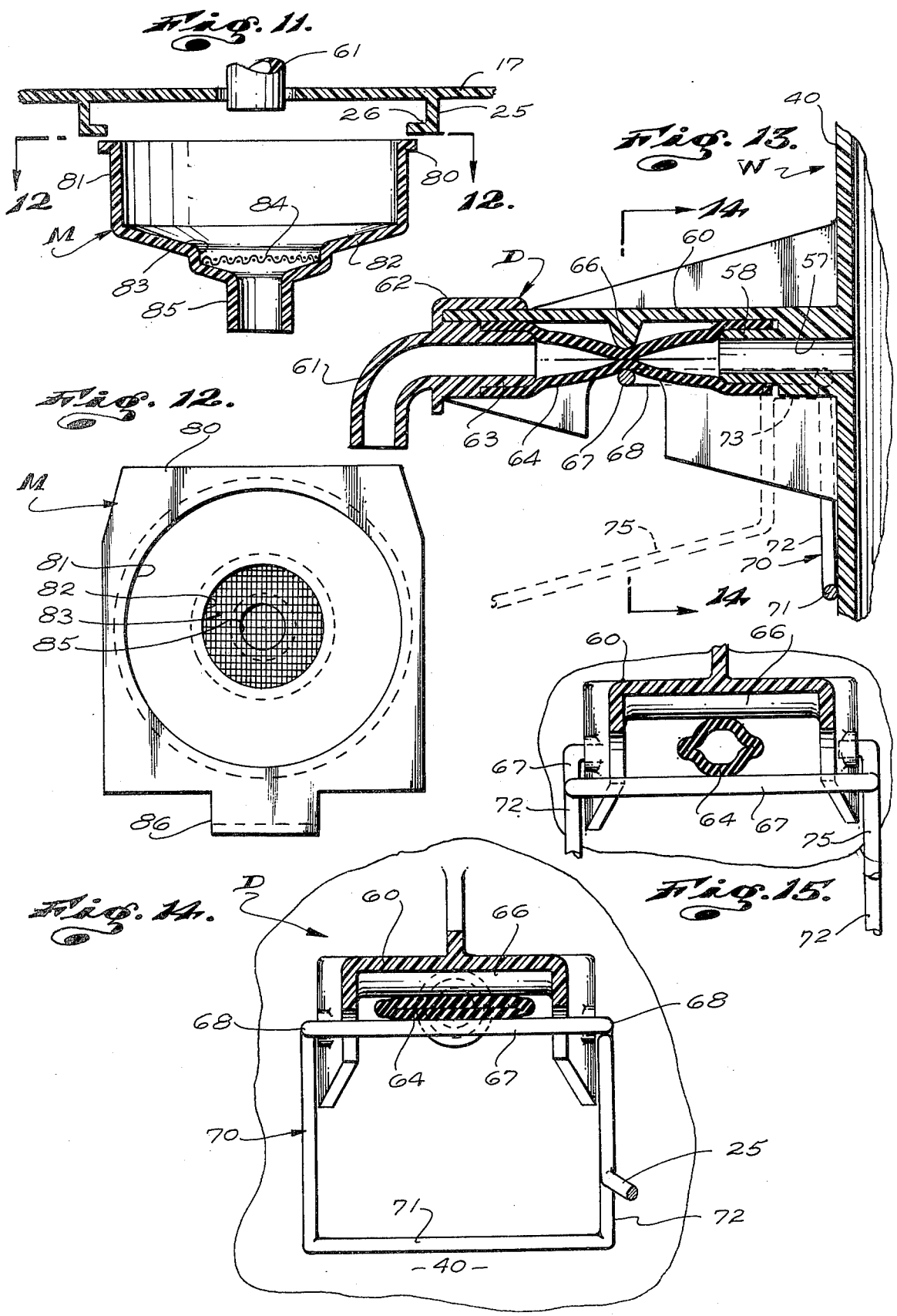

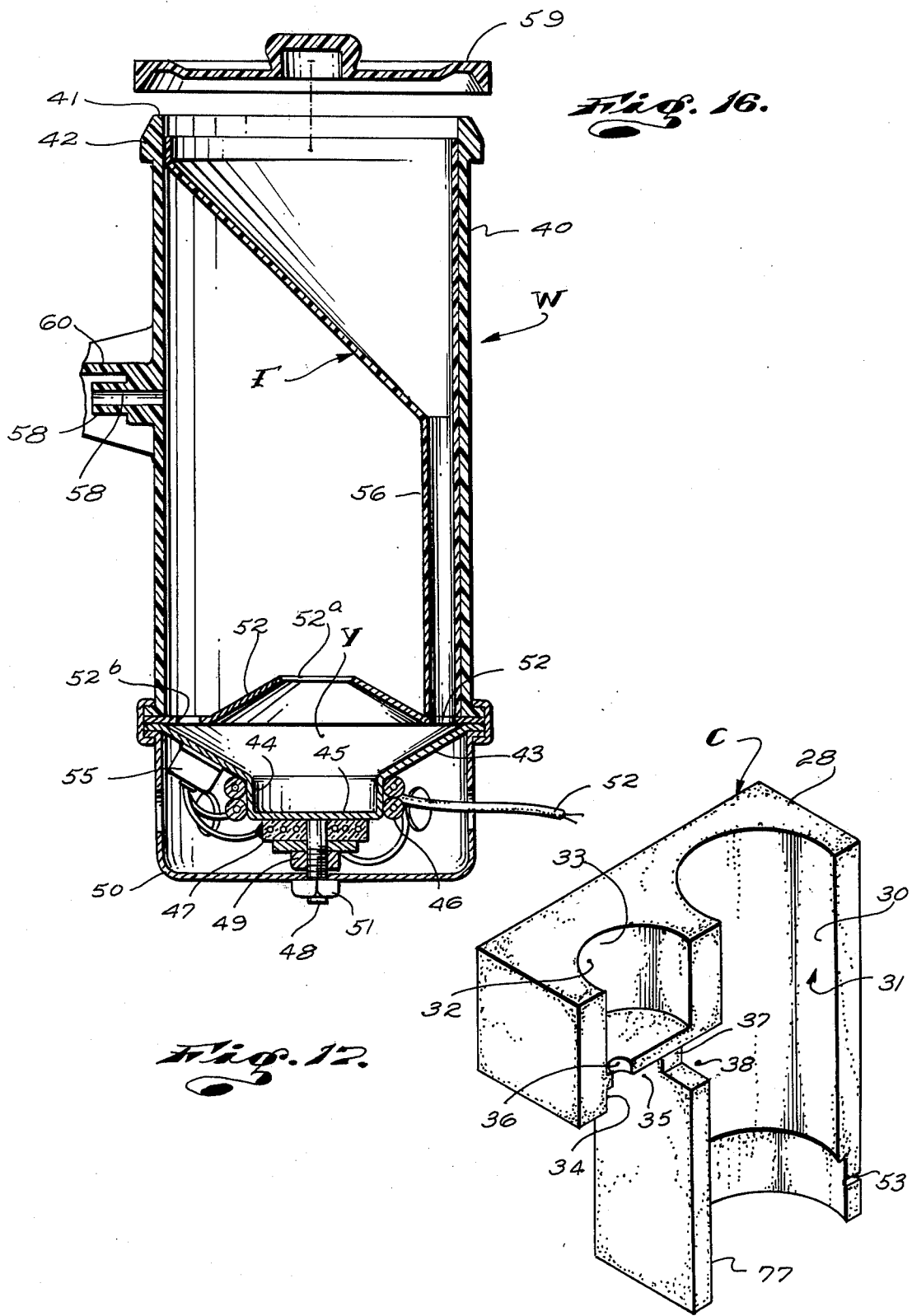

COFFEE MAKER

This invention has to do with a hot coffee dispensing machine and is particularly concerned with an improved machine for making hot coffee beverage with dehydrated coffee extract and hot water on demand, one cup at a time.

BACKGROUND OF THE INVENTION

In the art of preparing and serving hot coffee, it was long common practice to brew large or multi-serving batches of coffee beverage by steeping, percolating or otherwise leeching the oils and the like out of ground roasted coffee beans in or with hot water, to color and flavor the water or to convert the water into a hot coffee brew. This practice, while still favored by many and quite effective in many situations, is often inconvenient, extremely wasteful and therefore excessively costly in those instances where but one or two cups or servings of hot coffee are desired, at infrequent or widely spaced time intervals.

In recent years and to satisfy the ever-increasing demand for easy and economical to make single cups or servings of hot coffee, the art has dehydrated previously brewed coffee beverage to establish or make dry, powdered or granular coffee concentrate commonly referred to as instant coffee. Instant coffee is such that one can easily and quickly make a cup of hot coffee beverage by simply adding and stirring a teaspoon or similar measure of instant coffee into a cup containing hot water.

While the above noted provision and use of instant coffee has proved to be most effective, efficient and desirable, it requires the separate heating of water, dispensing of that water into a cup and the separate spooning and mixing of the instant coffee concentrate in and with the water. In many instances and under many circumstances these procedures, though simple and apparently rather convenient, are troublesome and messy.

The above has given rise to the recognition of a great need for a simple, inexpensive and easy to operate machine which is particularly adapted for making single servings of hot coffee, using dehydrated coffee concentrate, in a simple and convenient manner.

OBJECTS AND FEATURES OF THE INVENTION

An object of the present invention is to provide a novel machine for selectively and intermittently dispensing cups or servings of hot coffee established by the combining and mixing together of hot water and dehydrated, granular or powdered instant coffee concentrate.

It is an object and feature of my invention to provide a machine of the general character referred to which is such that it can be mass-produced at costs which are extremely low in comparison with the costs for manufacturing machines of similar nature, using materials and manufacturing techniques commonly used and employed by the prior art.

It is a particular object and feature of my invention to provide a machine which is made up of or includes a limited number of unitary components, each of which can be economically mass-produced and a machine which includes a novel housing and/or case structure which is easy and economical to mass-produce and which is such that the several components of the machine can be easily and quickly related to the housing by unskilled labor. That is, it is an object and feature of the invention to provide a novel coffee dispensing machine structure which is such that the limited number of easy and economical to make parts which go to make up the machine can be so quickly assembled by ordinary labor that the cost of assembly of the machine is substantially negligible and the resulting manufacturing cost and retail price of the machine can be made very low.

It is an object and feature of the present invention to provide a machine of the general character referred to above which includes a simple and inexpensive water supply tank with a simple water dispensing means and heater means related to it; a simple and inexpensive to make and use coffee concentrate dispensing or metering unit; a water and coffee concentrate mixing and dispensing unit and a novel housing structure for receiving and holding the tank and unit in predetermined working relationship with each other.

It is an object and feature of my invention to provide a housing structure comprising a pair of inexpensive heat insulating foam plastic block-like core sections or parts formed with cavities to cooperatively receive and hold the tank and dispensing unit, and which includes a molded plastic or sheet metal housing into which the assembled core parts and tank are slidably engaged and with which the coffee dispensing unit can be related and with which the mixing unit is slidably engaged, whereby assembly of the machine is not unlike or is similar to and requires no greater time and/or skill than is required to quickly package items in accordance with present day packaging practices which include the arranging of items in styrofoam item supporting blocks or the like in common cartons.

It is an object and feature of the present invention to provide a machine of the character referred to above wherein the heat insulating qualities of the plastic core which holds and carries components of the machine is utilized to establish a machine which is extremely effective and efficient to hold and store water at elevated temperatures and which is therefore extremely efficient to operate.

The foregoing and the notable number of other objects and features of my invention will be apparent and will be fully understood from the following detailed description of a typical preferred form and carrying out of the invention, throughout which description reference is made to the accompanying drawings.

DESCRIPTION OF THE DRAWINGS

FIG. 1 is an isometric view of the coffee dispensing machine that I provide;

FIG. 2 is an exploded isometric view of the machine shown in FIG. 1;

FIG. 3 is an enlarged sectional view taken substantially as indicated by line 3—3 on FIG. 1;

FIG. 4 is a sectional view taken substantially as indicated by line 4—4 on FIG. 3;

FIG. 5 is an enlarged detailed sectional view taken substantially as indicated by line 5—5 on FIG. 2;

FIG. 6 is a sectional view taken as indicated by line 6—6 on FIG. 5;

FIG. 7 is a sectional view taken as indicated by line 7—7 on FIG. 5;

FIG. 8 is a sectional view taken as indicated by line 8—8 on FIG. 7;

FIG. 9 is a view similar to FIG. 8 showing parts in another position;

FIG. 10 is a sectional view taken as indicated by line 10—10 on FIG. 5;

FIG. 11 is a sectional view taken as indicated by line 11—11 on FIG. 2;

FIG. 12 is a sectional view taken as indicated by line 12—12 on FIG. 11;

FIG. 13 is an enlarged detailed sectional view of a portion of the structure shown in FIG. 3;

FIG. 14 is a sectional view taken substantially as indicated by line 14—14 on FIG. 13;

FIG. 15 is a view of a portion of the structure shown in FIG. 14 with parts in another position;

FIG. 16 is a detailed sectional view of the tank and heater structure; and

FIG. 17 is an isometric view of one section or part of the core structure that I provide.

DETAILED DESCRIPTION OF THE INVENTION

The hot coffee dispensing machine A that I provide and which is illustrated throughout the drawings is a modified block-like unit with flat top, bottom, front, rear and side surfaces 10, 11, 12, 13 and 14, respectively. The front and side surfaces 12 and 14 are interrupted by a forwardly and laterally opening recess R having a flat horizontal upwardly disposed cup or drip tray supporting bottom surface 15, a vertical forwardly disposed forward surface 16 and a flat horizontal downwardly disposed upper surface 17. The top surface 10 is interrupted by a pair of apertures or openings from which the upper portions of a water heater unit W and a coffee concentrate metering unit U project. The downwardly disposed upper surface 17 in the recess R is constructed to cooperatively receive a mixing unit M.

The several surfaces 10 through 17 of the machine, noted above, are established by a thin-walled sheet metal or preferably a thin-walled molded plastic case or housing H. The case or housing H includes three parts, there being an upper forward, rearwardly and downwardly opening primary shell-like section I with walls defining the surfaces 10, 12, 14, 15, 16 and 17, which walls are identified by the same reference numbers as are the surfaces they define; a rear secondary section II defining the rear surface 13 and identified by the same reference number; and a secondary bottom part or section III establishing a bottom wall which defines the bottom surface II and is identified by the same reference number. The top wall and surface 10 of section I of the case has a forward vertical through opening 20 to accommodate the unit U and has a vertically and rearwardly opening rear opening 21 with a semi-circular forward edge to accommodate the unit W. The rear section II includes a flat vertical wall portion which snugly fits into the opening rear of the primary or front section I and has an upper forwardly projecting flange 22 with a semi-circular front edge 21' which projects into the rear portion of the opening 21 in the top wall so that the semi-circular edges cooperate to define an opening in the top of the case for the unit W.

The inside surfaces of the side walls 14 can be provided with protruberances or stops 23 to stop and orient the rear wall section II in position in section I. The bottom section III of the case is a flat horizontal pan-like part defining the bottom wall and surface II and can have an upwardly projecting orienting flange about its perimeter. Section III is snugly fitted in the open bottom of the assembly defined by the sections I and II.

In practice, the several sections I, II and III are welded or cemented together by suitably applied solvent or cement.

The downwardly disposed upper wall or surface 17 of section I has a pair of vertical through openings 25 and 25' and is formed with a pair of laterally spaced downwardly and laterally inwardly projecting forwardly and rearwardly extending ways 26 for the unit M, as will hereinafter be described.

Within and retained by the case H is a core C molded of cellular plastic having suitable heat stability and insulating characteristics. The core C comprises two half sections, there being left and righ-hand sections 27 and 28 which are mirror opposites of each other and have flat opposing inside surfaces 29. The core has a vertical rear portion which is coextensive with the inside vertical extent of the rear portion of the case H, with top, bottom, rear and side surfaces in close bearing and supported engagement with related portions of the top, side, bottom and rear walls of the case. The core next and/or further includes a forwardly projecting upper portion corresponding in configuration with the interior and occupying the upper forward portion of the case (above the recess R) defined by the upper forward portions of the top and side walls 10 and 14, the front wall 12, and the flat horizontal downwardly disposed upper wall 17 of the case.

In practice, the core sections are formed so that their corners and edges tightly fit in and with related corners and edges in the case H and the plain surfaces thereof are slightly concaved so that easy and convenient assembly and fitting of the core C in and with the case H is assured.

The sections 27 and 28 of the core have rear vertical opposing semi-circular recesses 30 (see FIG. 17) which cooperate to define a vertical through opening or bore 31 concentric and communicating with the opening 21 in the top wall 10 of the case and adapted to cooperatively receive and hold the unit W. The sections 27 and 28 next include forwardly and upwardly opening semi-circular opposing recesses 32 cooperating to define a forward upwardly opening recess 33, concentric and communicating with the opening 20 in the case H and adapted to cooperatively receive the unit U. The sections 27 and 28 next include forwardly downwardly opening opposing recesses 34 in the upper forward portion of the core sections, below the recess 33 and define a cavity 35 above and communicating with the opening 25 in the wall 17 of the case. Finally, the core sections are provided with notches or recesses cooperating to define a vertical orienting port 26 between the cavity 35 and recess 33 and a pair of opposing recesses 37 which cooperate to define a passage 38 between the bore 31 and the cavity 34 and adapted to accommodate a water dispensing means D as will hereinafter be described.

The case H and core C assembly thus far described and which serves to carry and house the units W, U, M and the means D is an extremely simple and economical to make structure comprising two molded core parts and three molded housing parts, each of which is easy and economical to make and all of which are particularly adapted to be easily and quickly related with each other in a minimum of time and with the exercise of ordinary skills.

The water heater unit W is an elongate vertical cylindrical unit having an upper cylindrical molded plastic tank 40 with an open top 41 having a radially outwardly projecting rim flange 42 and an open bottom closed by a downwardly convergent metallic bottom wall 43. The bottom wall 43 has a central upwardly opening depending cup portion 44 with a cylindrical side wall 45 and a flat bottom 45'. A helically formed electric resistance cartridge type heater 46 is engaged about and is fixed to the exterior of the side wall 45 as by welding and a secondary disc-type resistance heater 47 is arranged adjacent the bottom wall 45'. The heater 47 is retained against the bottom wall by a threaded stud 48 depending from that wall and a related fastener means 49.

In the preferred carrying out of the invention, a protective metal cup like cover 50 encloses and houses the bottom wall 45 and the heaters 46 and 47. The cover is retained by the stud 48 and fastener means 51.

Further, and in practice, a baffle 52 can be and is shown arranged within the tank above the bottom wall 43, in spaced relationship therewith and defining a heating chamber Y in the lower portion of the tank.

The lower end of the plastic tank 40, baffle 52, bottom wall 43 and cover 50 are formed with annular radially extending outside flanges which occur in sandwiched or stacked relationship with each other and which are securely held in tight, clamped, sealed engagement with each other by an annular, radially inwardly opening metal retaining band B, as clearly shown in FIG. 16 of the drawings.

In practice, the housing 50 is provided with a plurality of circumferentially spaced radially disposed air circulating openings 51 about its perimeter. A power supply cord 52 for the heaters extend through one of the openings 50 and thence rearwardly through an opening 53 defined by and in the core C and through a register opening 54 provided in the rear wall 13, substantially as illustrated in the drawings.

In practice, the lower end portion 31' of the bore 30 in the core C is enlarged to accommodate the noted banded together flanged portions of the parts which make up the unit W and to provide an annular air spaced between the cover 50 and the adjacent portion 31' of the bore in which the cord 52 can extend and to provide for the free circulation of heat and/or air about the exterior of the cover 50.

In practice, the heaters 46 and 47 can be connected in parallel with the conductors of the cord 52 and a normally closed temperature responsive switching device, such as a thermostatic switch 55, responsive to the temperature of the bottom wall 43 of the tank, can be series-connected in one of the lines to the heater 46. The switch 55 is operable to close when water within the tank and/or the bottom of the tank is cold or cooled to a predetermined minimum usable water temperature and to open when that temperature is exceeded.

The secondary heater 47 which heater remains energized at all times is a low wattage heater which only generates sufficient heat to maintain the temperature of the water at or slightly above the noted minimum temperature during normal use of the machine.

Since the exact arrangement and manner in which the cord 52, heaters 56 and 57 and the device 55 can be connected, can vary widely without departing from or affecting my invention, such details have not been illustrated and will not be described. Connecting of the several noted electrical components and/or parts can be effected in any suitable manner by one skilled in the art and without the exercise of invention.

The baffle 52 within the tank and defining the heating chamber Y is an upwardly convergent coincal partition like part projecting upwardly from the lower end of the tank 40 into the lower portion thereof and is truncated to define a central vertical through opening $52^a$ through which heated water is free to flow upwardly from the chamber Y into the upper storage portion of the tank, by convection currents.

The baffle 52 is also provided with two or more small vertical through openings $52^b$ about its lower outside perimeter through which cool water in the tank above the partition can flow downwardly and back into the heating chamber Y, by convection current. The flow capacity of the upper central opening $52^a$ is substantially greater than the cumulative flow capacity of the smaller openings $52^b$ whereby the hottest water in the chamber Y is free to flow upwardly out of the chamber Y and into the upper storage portion of the tank and to urge the cooler water above the portion down through the openings $52^b$. Such a relationship of the noted openings has been found to be most effective to maintain the supply of water above the partition "hot".

In the form of the invention shown, I have provided a filler funnel F within and occupying the upper portion of the tank 40. The funnel F has a depending delivery duct or spout 56 which communicates with one of the openings $52^b$. The funnel F is arranged in the tank as noted above and as illustrated in FIG. 16 of the drawings so that when cold water is added to the tank, to replenish the supply of water in the tank, the cold water is not mixed directly with the supply of heated water in the upper portion of the tank to cool the supply of heated water, but is conducted directly downwardly and into the heating chamber Y of the tank where it cools the bottom wall, closes the switching device and effects energizing of the primary heater 46. Accordingly, the addition of cold water into the tank unit W is quickly heated in the chamber Y and before it is permitted to flow upwardly from the chamber Y and mix with the supply of heated water in the tank outside of the funnel F.

The tank 40 next includes an outlet port 57 in its front or forwardly disposed side. The port 57 is in spaced relationship above the bottom of the tank on a horizontal plane which extends between the upper and lower planes of the cavity 35 and the passage 38 in the core C. The port 57 is shown extended through a forwardly projecting nipple 58 formed on the tank, which nipple projects into and/or through the passage 38.

The volume of water in the tank above the port 57 is equal to the volume of water intended to be dispensed by the machine between filling operations. The substantial volume of water in the tank below the port 57 is provided as a heat store, that is, a large volume of heated water below the port 57 is provided so that when cold water is added to the tank, a sufficient volume of heated water is in the tank to mix with and warm the added water to an acceptable and usable temperature, in the event that the heaters are ineffective to warm and/or heat the added water at a sufficiently fast rate.

Finally, the tank unit W is provided with a cover or lid 59 which is releasably cooperatively engaged over and covers the upper rim portion of the tank 40, as clearly illustrated in the drawings.

The water dispensing means D, best shown in FIGS. 3, 4, 13, 14 and 15 of the drawings, is carried by the tank 40, adjacent the port 57 and the nipple 58. The means D projects forwardly from the tank through the passage 38 in the core and into the cavity 35 of the core, above the wall 17 of the case.

The means D includes an elongate horizontal beam 60 in limited spaced relationship above the port 57 and nipple 58 and projects forwardly from the tank, through the passage 38 and into the chamber 35. The beam 60 can be a separate part fixed to or can be formed integrally with the tank, as shown.

The beam 60 carries a forwardly and downwardly turned downwardly opening weater dispensing nozzle 61. The nozzle 61 is a separate molded plastic part having a stop flange and retaining lip means 62 formed thereon to secure it to the forward end of the beam and has a rearwardly projecting nipple 63. The nipple 63 occurs below the beam, is spaced forward from and is preferably in axial alignment with the nipple 58 and port 57 of the tank 40. The downwardly opening end of the nozzle 61 extends downwardly in the cavity 35, centrally of and preferably freely through the opening 25 in the wall 17 whereby water is discharged thereby below and outside the cavity 35.

The means D next includes an elongate flexible deformable rubber-like valve tube bridging the nipples 58 and 63, with opposite end portions which are sealingly engaged about the nipples, as clearly shown in FIG. 13 of the drawings.

The tube 64 is an element of part of a pinch valve means and is preferably performed with opposing laterally inwardly opening longitudinally extending inside crease lines 65 which allow for its free transverse and vertical collapsing into that condition where it is pinched off and is sealed against the flow of water therethrough, as shown in FIG. 14 of the drawings.

The means D next includes an elongate horizontal mandrel 66 on and depending from the beam 60. The mandrel 66 is on an axis transverse the axis of and is located substantially midway between the ends of the tube 64. In practice, the mandrel normally establishes bearing engagement with the tube to depress or vertically collapse the upper portion of the tube a limited extent.

The means D next includes an elongate horizontal pressure bar 67 occurring in sapced parallel relationship with and below the mandrel and engaging the lower portion or half of the tube 64. The bar 67 is vertically shiftable and is normally yieldingly urged upwardly into forming pressure engagement with the lower portion of the tube to urge and hold the tube in flat tight, clamped, sealed condition between the bar and the mandrel, as shown in FIGS. 13 and 14 of the drawings. When the bar 67 is moved downwardly relatively to the tube and the mandrel, the tube yieldingly opens and allows for the free flow of water therethrough, as clearly shown in FIG. 14 of the drawings.

The bar 67 is carried by a pair of laterally spaced rearwardly projecting arms 68, the forward ends of which are preferably integrally joined with the ends of the bar and the rear ends of which are pivotally connected with the rear end portion of the beam 60, as by laterally inwardly turned pivot pins 69, formed on the rear ends of the arms and engaged in cooperating laterally outwardly opening pivot pin receiving openings in the beam.

The means D next includes spring means to normally yieldingly pivot and urge the arms 68 and the bar 67 upwardly and manually engageable operating means to pivot the arms and urge the bar downwardly. The spring means can vary widely in practice and in the form of the invention illustrated includes an elongate vertically extending U-shaped spring 70 having a horizontal base 71 extending transverse the front and engaging the tank 40 at a point spaced below the beam 60 and arms 69 and upwardly projecting legs 72 with forwardly turned extensions 73 fixed to the arms 69 as by welding. The spring 70 is normally biased so that its base 71 bears rearwardly against the tank 40, urging the legs rearwardly and thereby pivoting the arms and the bar related thereto upwardly.

The operating means can vary widely in form and construction and is shown as including an elongate downwardly and thence forwardly turned operating rod or lever 75 fixed to and depending from one of the arms 68, into a suitable slot formed in the core section 27 and the front wall 16 of the case H to project downwardly and forwardly beneath the wall 17 of the housing and into the forward portion of the recess R, at the front of the machine, at one side thereof. The lower forward end of the lever arm can be and is shown provided with a finger engaging pad 76.

In practice, and as shown in FIG. 3 of the drawings, the lever 75 can be an integral extension of the extension 73 on the end of one leg 72 of the spring 70.

It will be apparent that by downwardly applied finger pressure on the pad 76, the bar 67 is moved downwardly and out of tight clamped pressure engagement with the tube 64 and effects opening of the tube and resulting free flow of water from the tank 40 through the means D and out of the nozzle thereof.

The form and construction of the beam 60 can vary widely and is shown formed integrally with the tank 40 and as including those webs, gussets and/or flanges necessary to impart sufficient strength into the beam and structure to accommodate those several elements and/or parts which are related to it.

In carrying out my invention, upon assembly, the tank 40 with its directly related water dispensing means D is first engaged in the recess 30 of one section 27 or 28 of the core with its upper rim flange 42 stopped on tbe top of that core section and with the means D projecting freely forwardly through the passage forming notch 37 in that core section. The cord 52 for the heaters is extending rearwardly through a notch or recess in the core section which goes to form the opening 53 in the rear of the core. Next, the other core section is engaged over and with the previously assembled core section and tank unit. Further, and as can best be shown in FIGS. 2, 3 and 4 of the drawings, the subassembly comprised of the tank unit W and core sections is slid forwardly into engagement with the rearwardly and downwardly opening primary or front section I of the case H. The rear wall section II of the case is next pressed and set in the rear of the section I and against the rear of the core, with the cord extending through the opening 52 therein. Finally, the bottom wall section III is pressed upwardly into and is fixed in the bottom of the assembled sections I and II.

In practice, and in the form of the invention shown, the forward portion of the bore 31 defined by the assembled core sections 27 and 28 is provided with a vertical recess 77 extending between the passage 38 in the core and the bottom of the bore. The recess 77 cooperates with the tank structure to define a space for the spring 70 and more important, establishes a heat conducting passage or chimney which allows for and/or induces the flow of dry hot air from about the housing 50 at the bottom of the tank upwardly and forwardly through the passage 38 into the cavity 35 where it maintains the means D heated and the cavity 35 warm and dry. The hot air conducted into the cavity 35 advances down through the openings 25 and 25' in the wall 17 of the case into and through the mixing unit M to maintain the unit M warm and normally dry.

The mixing means M is a simple upwardly opening funnel like unit having a square outwardly projecting rim flange 80 corresponding in lateral extent with the ways depending from the wall 17 of the case H and manually slidably shiftable, rearwardly and forwardly, into and out of supported engagement with the ways 26 and in limited spaced relationship below the wall 17 for free ventilation of moisture ladened air between the unit and wall.

The funnel portion of the unit M has a cylindrical upper wall 81 depending from the flange 80, the downwardly convergent bottom wall 82, the central, upwardly opening recess 83 in which a filter screen 84 is set and a central depending, downwardly opening tubular drain or neck 85.

In practice, and as shown, a handle 86 is provided on the flange 80 of the unit M to facilitate movement of the unit into and out of engagement with the ways 26. The volume of the mixing unit M is sufficient to freely accommodate a full, large serving of beverage without the possibility of spillage.

The means M is easily and quickly removed for easy and convenient cleaning.

It is to be noted that the lever 75 and pad 76 of the valve operating means occurs and is freely accessible in the recess R of the machine at one side of the mixing unit M.

The lower end of the drain neck 85 of the means M is spaced above the bottom walls 15 of the recess R to freely accommodate a beverage receptacle, such as a cup and the upper open top of that funnel-like structure is below and aligned with dispensing spout of the means D to freely receive water flowing from that spout when the valve means is opened.

The coffee concentrate metering unit U is a separate unitary assembly which is freely movable, vertically, into and out of engagement in the forward upwardly opening cavity 33 in the core C and through the related opening 20 in the housing H, as clearly shown in FIGS. 2 and 3 of the drawings.

The unit U, the details of which are illustrated in FIGS. 5 through 10 of the drawings, includes an elongate, vertical open-ended body 90 with a cylindrical bore 91, an upper radially outwardly projecting rim flange 92, an intermediate partition 93 between the upper and lower ends and defining upper and lower compartments 94 and 95 and an annular radially inwardly opening groove 96 below the partitions and adjacent the lower open end of the bore 91.

The partition 93 in the body 90 has a segmental vertical through opening 97 which, for example, extends circumferentially from between 315° to 330° and which leaves or defines a substantially triangular, radially inwardly and rearwardly projecting screed and/or bearing flange 98 at the forward side of the body and a semi-circular retaining and orienting flange or lip 99 projecting radially inwardly from the bore about the exterior of the opening 97.

The unit U next includes a flat horizontal bottom wall 100 removably engaged in the lower end portion of the bore 91 of the body 90. The wall 100 has an annular depending flange 101 and is retained up in the bore of the body by a snap ring 102 engaged in the groove 96; which snap ring establishes stop engagement with the bottom edge of the flange 101. The wall 100 has a central vertical through opening 103 and has an elongate downwardly projecting or depending tubular concentrate conductor or tubular dispensing duct 104 which depends from the lower end of the body. The duct is at or adjacent the forward side of the unit in spaced relationship below the screed flange 98 defined by the partition in the body.

When the unit U is in working relationship in the machine and is set in the cavity 33 of the core C, the duct 104 projects down through the opening 36 in the core C and into the cavity 35 with its lower open end in alignment with and above the opening 25' in the wall 17 and above and remote from the upper open end of the mixing unit M, whereby the concentrate flowing from the duct falls freely through the dry cavity, through the opening 25 and into the unit M. The duct is preferably located so that the cncentrate delivered and falling therefrom is deposited on the screen 84 of the mixing unit M.

The concentrate metering unit U next includes an elongate, vertical cylinder 110 rotatably arranged in the lower compartment 95 with its cylindrical outer surface in substantial sliding engagement with the bore 91 in the compartment 95, its flat bottom surface slidably supported atop the bottom wall 100 and its flat top surface in sliding engagement below the partition 93, or the screed 98 and flange 99 defined by the partition 93.

The cylinder 110 has a plurality of elongate vertically opening, circumferentially spaced concentrate or material receiving and transporting chambers 111 in uniform circumferential spaced relationship and spaced radially on the same radial plane as the duct 104 whereby the chambers 111 are shiftable into and out of register and communication with the duct 104 and the compartment 95 of the body 90. In the case illustrated, there are eight chambers 111, each spaced 45° from the other. The volume of each chamber 111 is equivalent to one desired, predetermined measure of granular or powdered coffee concentrate.

The cylinder 110 finally includes a central drive shaft receiving opening 112 to cooperatively receive a vertical drive shaft for rotating the cylinder. In the case illustrated, the opening 112 is square or otherwise polygonal in cross-section. The unit U next includes a cover 114 normally engaged with the rim flange 92 of the body 90 and normally overlying and closing the upper ends of the body. The cover 114 has a central cylindrical bearing opening 115.

The unit U next includes manually operable material advancing and/or indexing means O to urge material or coffee concentrate deposited and stored in the upper compartment 94 of the body downwardly toward and through the opening 97 of the partition in the body and into the chambers 111 of the cylindrical 110 and to sequentially and incrementally rotate the cylinder 110.

The means O includes an elongate vertical drive shaft 120 with a lower portion drivingly engaged in and extending through the opening 112 in the cylinder 110 and depending freely through the opening 103 in the bottom wall 100 to depend therefrom. The shaft 120 has an upper portion projecting upwardly from the cylinder through a bearing opening in the screed flange 98 defined by the partition in the body, thence through the upper compartment 94 and freely upwardly into and through the opening 115 in the cover 114.

The means O next includes a flat horizontal material engaging and advancing plate 121 in the upper compartment 94 of the body to be moved or advanced downwardly therein to move or advance a supply of coffee concentrate in that compartment downwardly to the cylinder 110. The material advancing plate 121 is provided with sealing means 122 to seal between the bore 91 of the body and the plate and to thereby prevent the material or concentrate within the compartment from migrating upwardly above the plate and to prevent the migration of moisture downwardly about the plate and into the coffee concentrate in the compartment 94 below the plate.

The plate 121 next includes a central, elongate vertical operating stem 124 projecting upwardly therefrom and axially and rotatably shiftable in and through the openings 115 in the cover 114. The stem 123 is provided with a manually engageable disc-like handle 124 at its upper end and accessible at the exterior of the unit. The vertical extent of the stem 123 is sufficient and such that upon and/or by manual engagement of the handle 116, the plate 121 can be rotated and can be moved axially from the top to the bottom of the upper compartment 94 in the unit body 90.

The stem 123 is tubular and has a central, vertical opening 125 to slidably receive and establish rotary driving engagement with the upper portion of the shaft 120. In the case illustrated, the opening 125 and the upper portion of the shaft 120 are polygonal in cross-section, for example, they are hexagonal in cross-section.

The means O next includes indexing means I to limit incremental manual clock-wise rotation of the means 45° with resulting sequential advancement and movement of the chambers 111 of the cylinders 110 beneath the screed flange 98 and into aligned communication with the chute 104.

The means I can vary widely in form and is shown as including an arm 130 secured to and projecting radially outward from the shaft 120, above the screed flange 98 and a pair of upwardly projecting arm-engaging stops 131 on the screed flange and spaced 45° apart.

The means I next includes an elongate circumferentially and downwardly extending apring latch 132 with an upper forward end fixed to the arm 130. The latch is shown extending counter-clockwise from the arm at a point above the screed flange and into the opening 97 defined by the partition 93 and has a lower rear or trailing end spaced at least 45° from the screed flange and on which is formed a downwardly and thence clockwise extending finger or tab 133, the lower free end of which normally enters and establishes stopped driving engagement in and with the upper end portion of a related chamber 111 in the cylinder 110, as shown in FIG. 8 of the drawings. With the structure set forth above, it will be apparent that upon counter-clockwise movement of the latch, the tab 133° cams or rides up and out of its related cylinder 111 and is free to move counter-clockwise into engagement with the next advancing chamber 111, as shown in FIG. 9 of the drawings.

It will be apparent that if desired, the spring latch 132 could extend circumferentially clockwise and downwardly from the arm to engage in the chambers 111 without departing from the spirit of this invention, whereby the latch would push the cylinder circumferentially, rather than tow it circumferentially as it does in the illustrated form of the invention.

Finally, the means O includes a spring means to normally yieldingly drive and/or rotate the shaft 120 and the arm 130 on the shaft in a counter-clockwise direction and into that stopped position shown in FIG. 7 of the drawings, where the latch 132 establishes driving engagement in a chamber 111 of the cylinder 110 and readies the means O for manual clock-wise rotation and advancement of a material filled chamber 111 beneath the screed flange and into aligned material discharging alignment above the chute 104, when the arm is stopped by a stop 131 in its clock-wise stopped position.

The spring means noted above can vary widely in form and is shown as including a segmental parabolically curved or convolute spring beneath the bottom wall 100 with one end anchored to the lower end of the shaft 120 by engagement of an end of the spring through an opening in the shaft and its other end yieldingly urged and set in a corner established by the spout 104 and the flange 101 of the bottom wall 100, as clearly shown in FIG. 10 of the drawings. The spring is biased to normally yieldingly urge and hold the arm 130 of the means O in its counter-clockwise stopped position and to return the arm to that position subsequent to its being manually moved to its other or clockwise stopped position in the manner noted above.

While it need not be discussed or described in detail, it will be noted that the screed flange functions to level off the measured volume of coffee concentrate in the chambers 111 as the cylinder rotates and the chambers are advanced beneath the screed flange.

It is notable that in operation, when the unit U is removably engaged and set in the machine, measured volumes of coffee concentrate can be deposited into the mixing unit M, one measure at a time, by manual engagement of the handle 124 atop the machine and turning that handle 45° in a clock-wise direction to its clockwise stopped position.

Further, such manual engagement and movement of the handle 124 is normally accompanied by manually exerted pressure downwardly on and through the handle to the plate 121 and into and through the concentrate beneath the plate whereby the supply of concentrate in the unit is constantly manually urged down and advanced into desired engagement with the cylinder 110 and into the chambers 111 thereof.

Still further, when the unit is operated in the manner set forth above, the plate 121 is moved circumferentially 45° clockwise and counter-clockwise each time the unit is operated, which motion of the plate, coupled with the downward pressure exerted on the concentrate by the plate, enhances and assures desired and proper downward movement of the supply of concentrate in and through the construction.

In practice, all of the parts making up the unit U can be established and molded of a plastic resin. In the preferred carrying out of the invention, the snap ring, shaft and spring latch are preferably metal parts and the remainder of the parts making up the unit U are molded plastic.

It is notable that the unit U is easy and economical to make, is easy and quickly related to the machine. Further, it is easily removed from the machine for the purpose of refilling and/or cleaning.

In operation, when a cup of coffee is to be served, a cup to receive the coffee is positioned in the recess R of the machine. Next, the means O of the unit U is manually actuated to deliver a measured volume of coffee concentrate into the mixing unit M. Thereafter, the lever 75 of the means D is manually depressed to open the valve means and allow hot water to flow from the tank unit W into the unit M to mix with and/or dissolve the concentrate deposited therein and to thereafter drain into the cup. In practice, the mixing means is proportioned and designed so that the measured volume of coffee concentrated therein to establish a cup of coffee, is dissolved and/or washed away before the cup into which the coffee is deposited is filled. Accordingly, before the cup is filled with coffee, the hot water draining from the unit M and into the cup is clear or substantially clear. Accordingly, at the time of brewing or making and dispensing each cup of coffee, the mixing unit M is washed and substantially cleaned by the last portion of the last volume of hot water which flowed therethrough to top off the cup of coffee.

An important feature of my invention is the heat insulating characteristic of and temperature control afforded by the core structure C, in which the unit W and the unit U are engaged. The core C, in addition to insulating the water heating unit W against heat losses and resulting operating inefficiencies, insulates the concentrate metering and dispensing unit U from the heat of the unit W and prevents excessive heating of the unit U and resulting heat degradation of the coffee concentrates stored therein. The core structure beneath the unit U and defining the top of the cavity 35 prevents heat in the cavity from reaching and adversely affecting the unit U and the concentrate therein. The heat or heated air which is directed from the lower portion of the unit W through the tunnel in the bore of the core, through the passage 38 and into the cavity 35, is sufficient to warm and to dry the structure defining the chamber 35, but is insufficient to overheat the core material between the chamber 35 and the unit U to an extent that the temperature of that unit and its contents might become excessive. It is important to note that the duct 104 of the unit U, the lower end of which is the only portion of that unit exposed to the interior of the chamber 35, is open, normally empty and wholly below the supply of concentrate in the unit. Further, the duct 104 is a thin wall structure of plastic material having a low index of heat conductivity and is therefore such that it is incapable of absorbing and conducting any appreciable heat from within the chamber 35 up to the supply of concentrate. Since the upper end of the duct 104 is normally closed, no chimney effect, tending to cause heat and/or moisture within the chamber 35 to move up into the unit U, can take place. The continuous though limited flow of dry hot air into the chamber 35 flows out of the chamber through the openings 25 and 25' and effectively carries away moisture which might otherwise be left in the construction to migrate up through the duct 104 of the unit U to cause serious moisture degradation of the coffee concentrate therein.

The ability of the construction to insulate and keep the coffee concentrate dry and at a suitable temperature whereby degradation of the coffee concentrate does not occur is most important, since the very utility of such a machine is dependent upon the effectiveness of the machine to store concentrate for protracted periods of time without adverse effects or degradation thereof.

In furtherance of the above, it is to be particularly noted that the plate 121 of the unit U, with its sealing means 122, effectively follows the supply of concentrate in the unit to exclude excess oxygen and moisture entering the top of the unit from reaching and adversely affecting the supply or concentrate therein.

From the foregoing description of the coffee machine structure that I provide, it will be apparent that the machine is simple, effective and dependable in operation and is such that its cost of manufacture and its ultimate cost to the purchasing public can be extraordinarily low.

Having described only one typical preferred form and/or application of my invention, I do not wish to be limited to the specific details herein set forth but wish to reserve to myself any modifications and/or variations that may appear to those skilled in the art and which fall within the scope of the following claims:

Having described my invention, I claim:

1. A coffee making machine comprising an elongate vertical hot water supply unit with an upwardly opening tank, resistance heater means at the lower end of the tank and including a power cord extending from the machine to a suitable power source and a lid removably engageable over the upper end of the tank, water dispensing means including a forwardly opening water outlet port in the tank, a normally closed valve with inlet and outlet ends, said inlet end communicating with the outlet port, a downwardly opening water discharge spout communicating with said outlet end and a manually engageable operating lever projecting from the valve, an elongate vertical granular coffee concentrate dispensing unit comprising an upwardly opening concentrate supply body, a cover removably engaged over the body, a downwardly projecting concentrate discharge chute depending from the body and arranged to occur laterally of the spout, concentrate metering means in the body to move measured volumes of concentrate to said duct for discharge therefrom and operating means for the metering means including a manually engageable handle accessible at the exterior of the body, a funnel-like mixing unit with an open top below and receiving water and concentrate from the spout and the duct and having a downwardly opening coffee discharge opening below which a coffee beverage receptacle is arranged, a core of heat resistive and heat insulating foam plastic resin with a bore in which the water unit is positioned, a recess in heat insulated relationship from the bore in which the dispensing unit is positioned and a downwardly opening cavity in heat insulated relationship from the bore and the recess and into which the nozzle and duct project, a thin-walled case about the core having a recess below the cavity to accommodate the mixing unit and a coffee receptacle arranged below the mixing unit, an opening communicating between the cavity and the mixing unit and openings at the upper ends of said tank and body; said lid, cover, operating lever and handle are accessible from the exterior of the case.

2. The coffee making machine set forth in claim 1 wherein the core is sectional and includes sections with opposing recesses which cooperate to define the bore, recess and cavity and wherein said case is sectional and includes a primary section with at least one open side and into which the core is slidably engaged and at least one secondary section engageable with and closing the primary section and retaining the core therein.

3. The coffee making machine set forth in claim 2 wherein the core has a vertical orienting port between the cavity and the recess through which said chute projects and a passage between the cavity and the bore through which the water dispensing means projects.

4. The coffee making machine set forth in claim 3 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally drive moisture from within the cavity and about the chute.

5. The coffee making machine set forth in claim 1 wherein the core has a vertical orienting port between the cavity and the recess through which said chute projects and a passage between the cavity and the bore through which the water dispening means projects.

6. The coffee making machine set forth in claim 5 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally drive moisture from within the cavity and about the chute.

7. The coffee making machine set forth in claim 1 wherein the body of the dispensing means is tubular and has upper and lower ends, a bottom wall closes the lower end of the body, the cover closes the upper end of the body, a cylinder with a plurality of circumferentially spaced vertica-ly opening chambers is rotatably engaged in the lower portion of the body above the bottom wall, said cylinder is rotatable to sequentially align the chambers with the chute which opens at and depends from said bottom wall, a screed is carried by the body to overlie the chamber aligned with the chute, the cylinder is driven by a shaft projecting upwardly through and from the unit and on which the handle is engaged, an arm projects radially from the shaft and is shiftable circumferentially between a pair of stops spaced apart a distance equal to the distance between the vertical axes of adjacent chambers and latch means is provided to releasably establish driving engagement with the cylinder and is driven circumferentially through the shaft.

8. The coffee making machine set forth in claim 7 wherein the core is sectional and includes sections with opposing recesses which cooperate to define the bore, recess and cavity and wherein said case is sectional and includes a primary section with at least one open side and into which the core is slidably engaged and at least one secondary section engageable with and closing the primary section and retaining the core therein.

9. The coffee making machine set forth in claim 8 wherein the core has a vertical orienting port between the cavity and the recess through which said chute projects and a passage between the cavity and the bore through which the water dispensing means projects.

10. The coffee making machine set forth in claim 8 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally pick up moisture in the cavity and about the chute and carry it away.

11. The coffee making machine set forth in claim 7 wherein the core has a vertical orienting port between the cavity and the recess through which said chute projects and a passage between the cavity and the bore through which the water dispensing means projects.

12. The coffee making machine set forth in claim 11 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally pick up moisture in the cavity and about the chute and carry it away.

13. The structure set forth in claim 7 wherein the dispensing means further includes a vertically shiftable plate in the body to engage the top of a supply of coffee concentrate in the body above the cylinder, sealing means between the plate and the body, a vertical tubular stem projecting upwardly from the plate through the lid and from the unit and on which said handle is fixed, said shaft is engaged with the stem for free axial shifting and in circumferential driving engagement therewith.

14. The coffee making machine set forth in claim 13 wherein the core in sectional and includes sections with opposing recesses which cooperate to define the bore, recess and cavity and wherein said case is sectional and includes a primary section with at least one open side and into which the core is slidably engaged and at least one secondary section engageable with and closing the primary section and retaining the core therein.

15. The coffee making machine set forth in claim 14 wherein the core has a vertical orienting port between the cavity and the recess through which said chute projects and a passage between the cavity and the bore through which the water dispensing means projects.

16. The coffee making machine set forth in claim 14 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally pick up moisture in the cavity and about the chute and carry it away.

17. The coffee making machine set forth in claim 13 wherein the core has a vertical orienting port between the cavity and the recess through which said chute projects and a passage between the cavity and the bore through which the water dispensing means projects.

18. The coffee making machine set forth in claim 17 wherein the core has a vertical channel opening into the bore and extending downwardly from said passage and cooperating with the tank to define a chimney from adjacent the resistance heater means and said passage whereby heat is conducted and flows from the heater means through the chimney and passage into and thence from the cavity to normally pick up moisture in the cavity and about the chute and carry it away.

* * * * *